Sept. 30, 1969     W. L. McCANN ET AL     3,469,496
QUILL SUPPORT FOR MACHINE TOOL SPINDLES
Filed Nov. 18, 1966     4 Sheets-Sheet 4

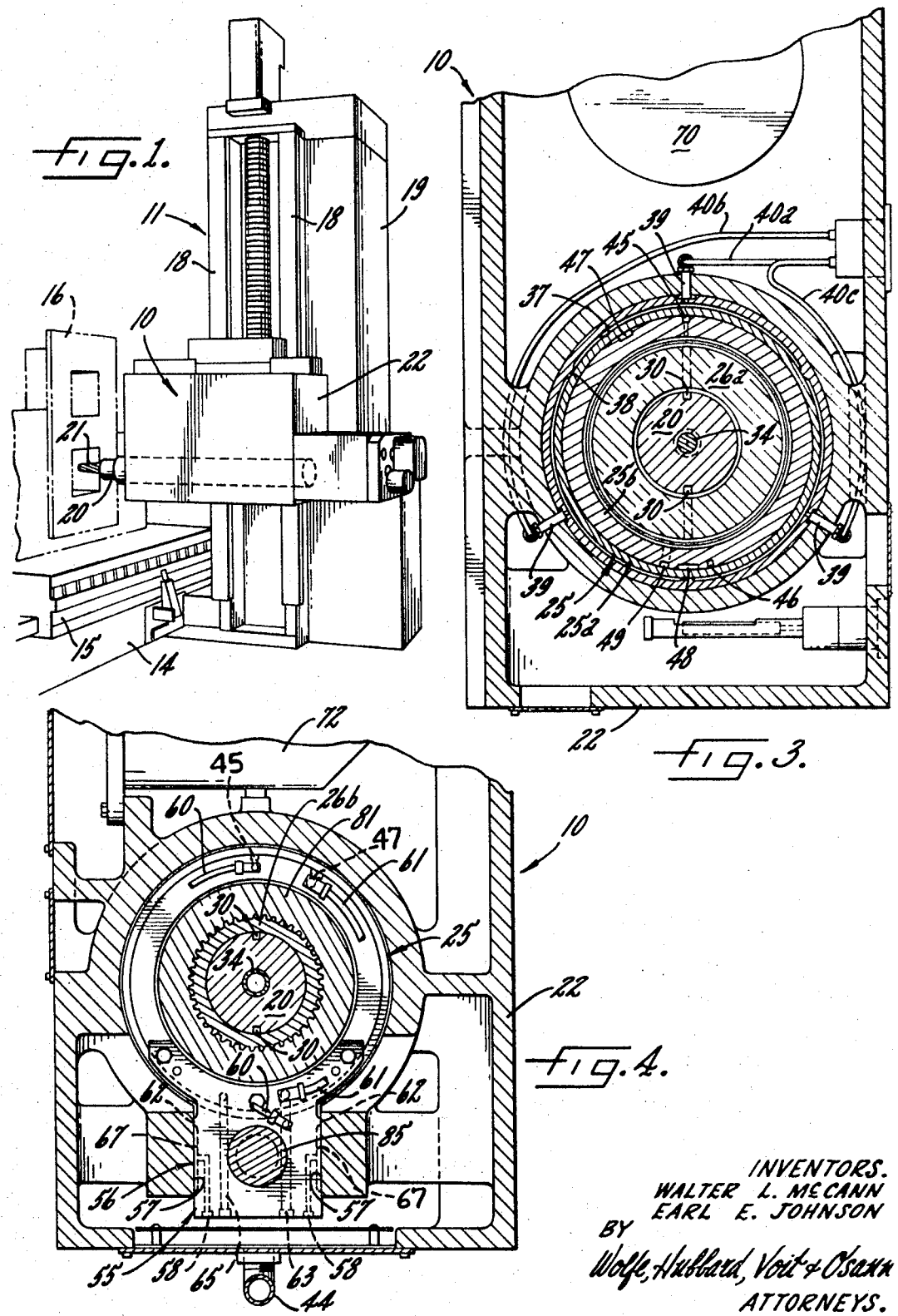

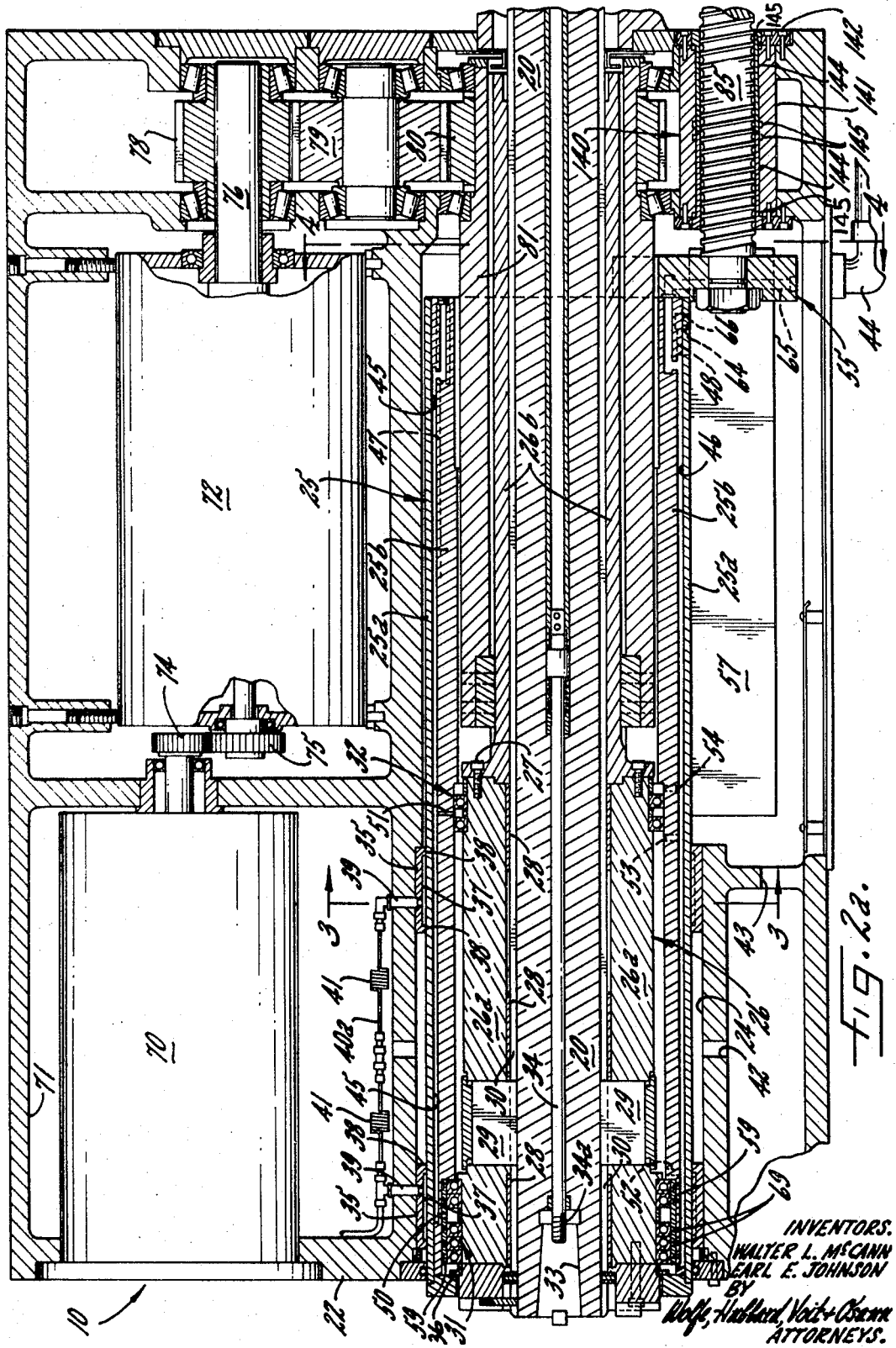

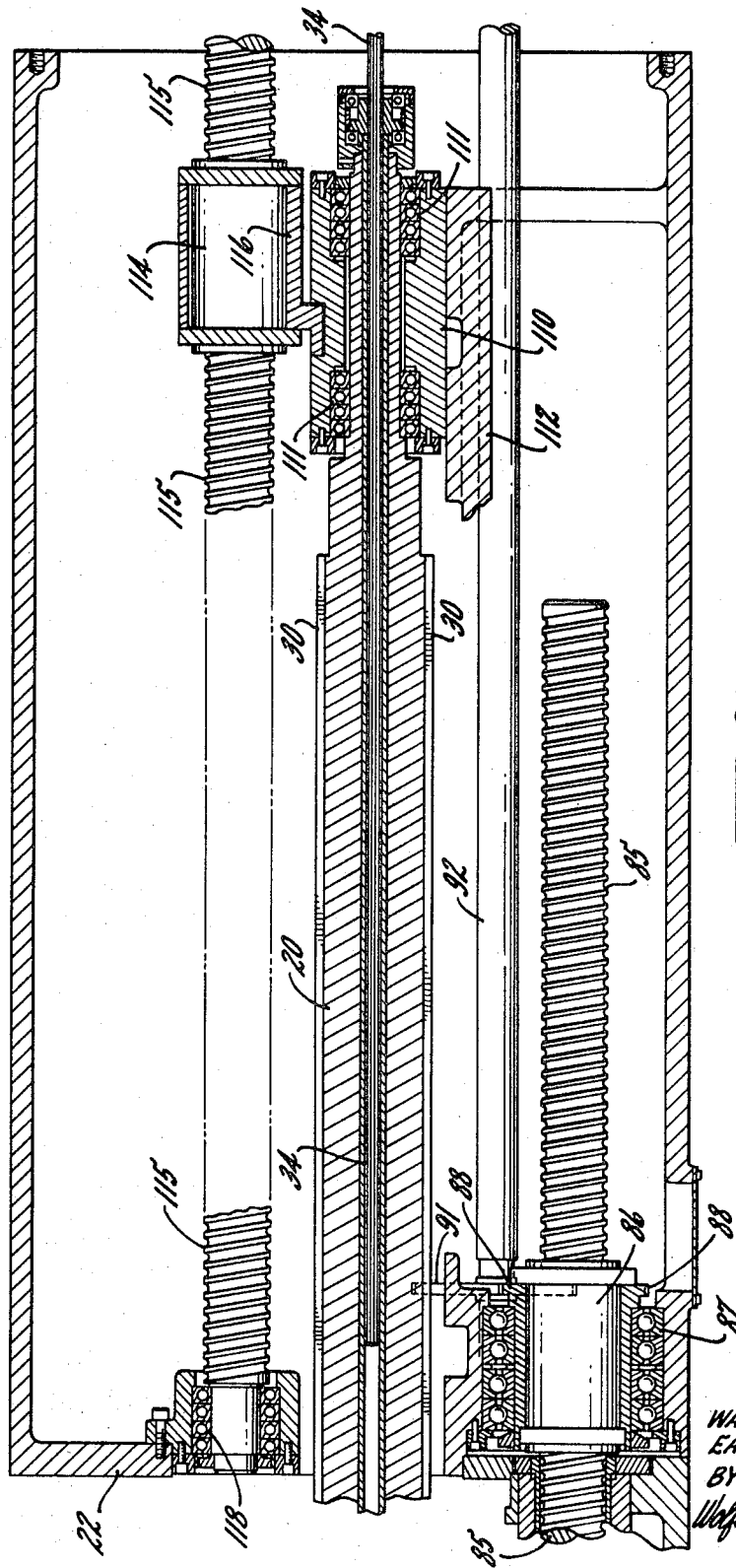

INVENTORS.
WALTER L. McCANN
EARL E. JOHNSON
BY
Wolfe, Hubbard, Voit & Osann
ATTORNEYS.

3,469,496
QUILL SUPPORT FOR MACHINE
TOOL SPINDLES
Walter L. McCann and Earl E. Johnson, Fond du Lac,
Wis., assignors to Giddings & Lewis Inc., a corporation
of Wisconsin
Filed Nov. 18, 1966, Ser. No. 595,504
Int. Cl. B23c 9/00
U.S. Cl. 90—14                                    9 Claims

ABSTRACT OF THE DISCLOSURE

A headstock assembly having a quill type spindle support mounted in the headstock on hydrostatic bearings which permit substantially friction-free axial movement of the quill while providing rigid radial support capable of maintaining accurate axial alignment of the quill and spindle when the quill is overhanging said bearing support by as much as one-half the length of the quill and the spindle is axially extended with respect to the quill. To facilitate even more accurate support and axial alignment of the extended quill and spindle, the quill has disposed at one end a depending guide key which is in a hydrostatic bearing relationship with guide surfaces in the headstock, and a hydraulic clamp is provided to rigidly secure the quill feed screw when the quill is in its extended position.

---

The present invention relates to spindle headstocks for machine tools and, more particularly, to an improved spindle mounting which utilizes a quill type support.

The value of quill type mountings for machine tool spindles has been recognized for many years in the machine tool trade. Basically, the quill type mounting makes possible axial traverse of the machine spindle while providing bearing support for the spindle relative to the headstock.

Those machine tool quill structures known heretofore have included certain deficiencies which have materially reduced their effectiveness. Most prior quills have been adapted for very limited axial traverse, normally in the range of 6 to 18 inches. Prior quill structures have also lacked means for effectively dissipating heat generated in the relatively large spindle bearings. In addition, prior quill structures have tended to be inaccurate due to poor quill bearing support and misalignment from quill clamping devices which grip the quill directly.

It is an object of the present invention to provide a headstock assembly which utilizes a quill type spindle support permitting greater axial traverse of the spindle than supports of the kind heretofore known.

Another object is to provide a headstock assembly as characterized above wherein the quill support utilizes hydrostatic bearing means throughout which more rigidly supports the quill so as to prevent misalignment of the machine spindle.

A further object is to provide a headstock assembly of the above kind in which the quill support is adapted to permit effective lubricating and cooling of the spindle bearings within the quill.

Still another object is to provide a headstock structure of the foregoing type in which a ball screw feed means axially drives the quill and spindle. A related object is to provide a hydraulic clamping means which is adapted to engage the ball feed screw so as to prevent movement of the quill and spindle during machining operations.

Other objects and advantages will become apparent as the following description proceeds, taken together with the accompanying drawings, wherein:

FIG. 1 is a perspective view of an illustrative machine tool in which the present invention is incorporated;

FIGS. 2a and 2b are enlarged fragmentary longitudinal vertical sectional views taken through the headstock of the machine tool shown in FIG. 1;

Figures 5, 6:
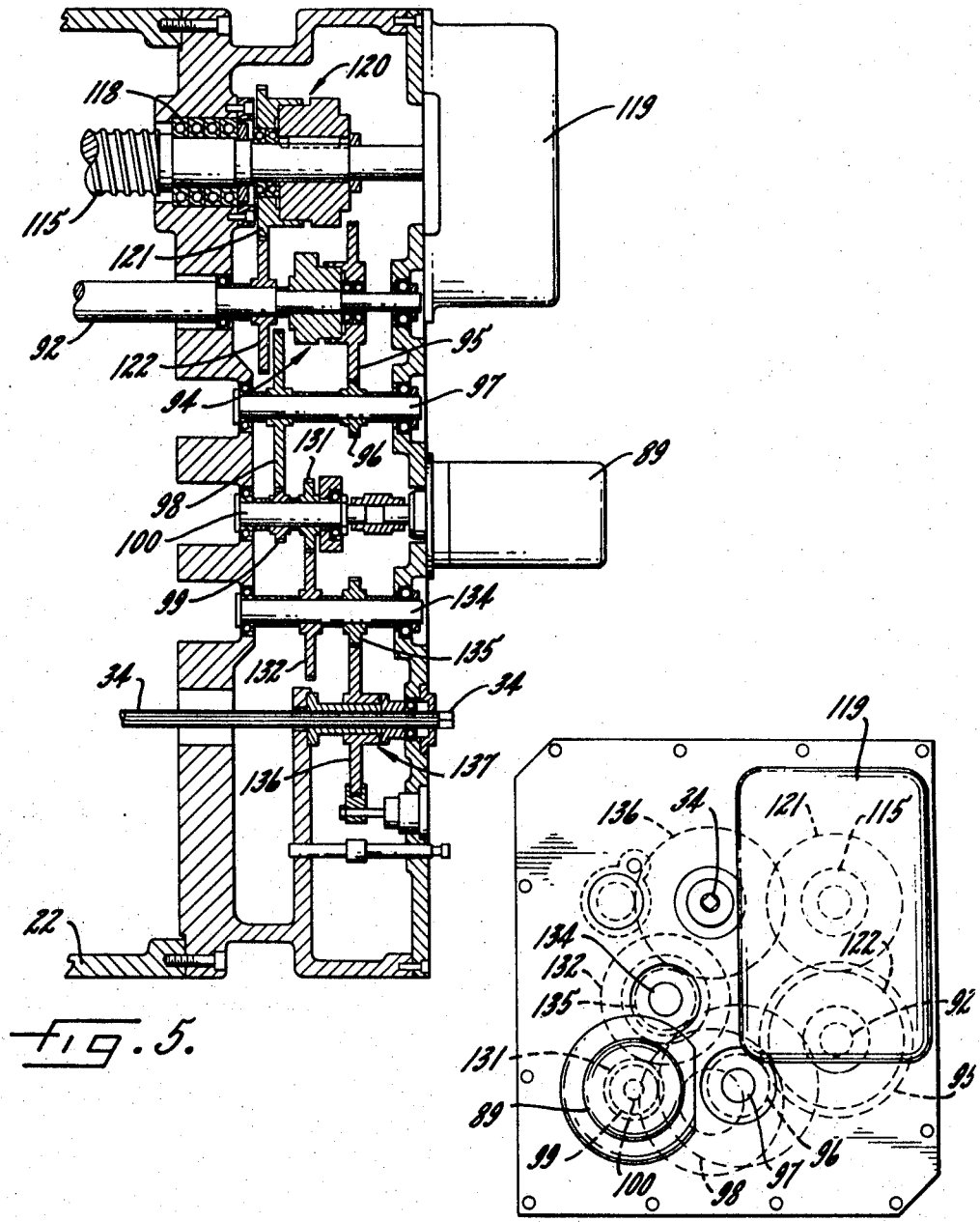

FIGS. 3 and 4 are fragmentary vertical sectional views through the headstock as shown in FIG. 2a taken in the plane of lines 3—3 and 4—4, respectively;

FIG. 5 is a spread out fragmentary sectional view of the gear drive system for traversing the spindle and quill in the headstock shown in FIGS. 2a and 2b;

FIG. 6 is a plane view of the gear drive system shown in FIG. 5, with the components in axial relationship.

While the invention is susceptible of various modifications and alternative forms, a specific embodiment thereof is shown by way of example in the drawings and will be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

Referring more specifically to FIG. 1, the invention is there exemplified in an illustrative headstock 10 mounted in operative position in a horizontal boring, drilling, and milling machine 11. The latter comprises a bed 14 having ways on its top surface which support a work table 15 for longitudinal sliding movement thereon. A workpiece 16, which is to be machined, is mounted on the table 15 in any suitable manner.

The headstock 10 is vertically positionable on guide ways 18 fixed to an upstanding column 19 located at one side of the bed 14. An extensible power-driven spindle 20 is rotatably and translatably supported in the headstock 10. The projecting end of the spindle 20 is adapted to receive and drivingly engage a tool 21 by an appropriate coupling means.

The headstock 10 as shown in FIGS. 2–4 comprises a housing 22 having a bore 24 which horizontally supports a quill 25 for axial translation. A spindle sleeve 26 is rotatably supported within the quill 25 by front and rear bearings 31 and 32, respectively. The illustrated spindle sleeve 26 is comprised of front and rear sections 26a and 26b which are rigidly held together by bolts 27. The sleeve 26 in turn supports the spindle 20 on hardened steel bushings 28 for relative axial traverse. In order to provide a rotary drive connection between the spindle 20 and sleeve 26 that will permit axial translation of the spindle relative to the sleeve, resort is had to radial keys 29 secured to the sleeve and which ride in longitudinal key ways 30 extending the length of the spindle 20.

For drivingly securing tools in the spindle 20, a drawbolt 34 is rotatably disposed in an axial bore therein. The drawbolt 34 has a threaded end 34a adapted to engage a threaded tool holder and draw it into the tapered recess 33 in the spindle 20 upon rotation of the bolt 34. It should be appreciated, however, that certain cutting tools such as milling cutters may be secured directly to the spindle sleeve 26 as by means of a plurality of mounting screws. With a milling cutter mounted in this manner, flat surface milling cuts may readily be made by securing the quill 25 at any adjusted axial position relative to the headstock housing.

In accordance with one aspect of the invention, the quill assembly is held within the headstock by hydrostatic bearing means adapted to permit substantially friction free axial movement of the quill relative to the housing while providing rigid radial support to the quill structure so as to prevent misalignment of the spindle when the quill and spindle are axially extended. In the illustrated embodiment, a pair of axially spaced hydrostatic annular bearings 35 is provided within the bore 24 of the housing 22. Each bearing is formed with pads or lands 38 upon which the smooth outer surface of the quill 25 slides in bearing relationship so as to define fluid chambers 37 circumferentially spaced about the periphery of the quill. Pressurized fluid is supplied to the chambers 37 through radial ports 39 in the housing 22 and lines 40a–c which connect the various ports 39 to an appropriate pressure source.

The relative dimensions of the pads 38 and the quill diameter are such that a chamber of pressurized fluid is maintained within the circumferentially spaced pads and against the quill so as to accurately retain the quill in a predetermined radial position relative to the headstock housing throughout the axial movement of the quill. To restrict the fluid flow to the bearings, capillary tubes 41 are interposed in each pressure line 40a–c. The limited amount of fluid which flows past the accurately controlled clearance between the pads and quill drains into the headstock housing through openings 42, 43 and returns to the fluid supply source through the exit pipe 44. Thus, due to the fluid support, virtually no frictional resistance exists during axial movement of the quill and the bearing pads experience no wear so that accurate radial support of the quill is maintained indefinitely.

In keeping with the invention a guide key 55 dependingly secured to the rear of the quill is provided with hydrostatic bearing supports so as to be adapted to accurately guide axial movement of the quill relative to the headstock. To this end, the housing 22 is formed with a pair of opposed parallel plane guide surfaces 57 which are aligned parallel with the axis of the quill 25. The guide key 55 is formed with hydrostatic bearings 56 on opposite sides which have close fitting slide bearing relationship with the guide surfaces 57. The bearings include lands 62 which define chambers 67 that are supplied with pressurized hydraulic fluid through ports 58 in the quide key. As in the case with the quill bearings 35, the pressure in the guide key bearing 56 may be maintained so that a pressure fluid film exists between the pads 67 and the guide surfaces which accurately supports the key for sliding movement with minimum friction.

The quill guide key 55 and hydrostatic bearing supports 35 permit the quill 25, which has a substantially greater length than the spread of the annular bearing pads 35, to be accurately supported while overhanging its bearing support up to one-half its full length. Such increased axial movement of the quill together with additional axial extensibility of the spindle permits much greater machining capabilities than heretofore possible. The substantial proportions and anti-friction qualities of the guide key also adapts the quill for supporting and guiding angle milling attachments and the like use during the machining operation. In addition, it will be apparent that the quill key serves as a convenient bracket for connecting the quill feed screw to the quill as well as providing a bracket for connections of fluid conduit lines to the quill from a fluid supply source.

In order to lubricate and cool the spindle ball bearings 31, 32, the quill structure is formed with a series of fluid supply and return passageways. In the illustrated embodiment, to facilitate forming the passages, the quill is comprised of an outer tube 25a shrunk in place on an inner tube 25b which is formed with angularly spaced longitudinal slots 45, 46, 47, 48 and 49. As shown in FIG. 4, the slots 45 and 47, which serve as supply passages, receive fluid from conduits 60 and 61, respectively. The conduits 60 and 61 join a passageway 63 formed in the guide key 55. The passageway 63 receives the lubricating fluid from an appropriate pump, not shown, at the bottom of the headstock after it has been circulated through a heat exchange unit to lower the fluid temperature to a desired level.

Thus, the fluid supply slot 45 through the top portion of the quill carries lubricant which has been cooled to the spindle bearings 31, 32. The fluid enters the bearings through radial ports 50, 51 in the quill, flows around the bearings, and then flows out radial ports 52, 53, 54 to the bottom return slot 49. A radial port 64 through the outer quill tube at the opposite end of the quill intersects the return passageway 49 to provide a gravity drain for the fluid to the exit pipe 44 which leads to the headstock sump pump.

Excess fluid from the front side of bearing 31 is collected in a labyrinth seal 36 and carried away by the lower slot 46. At the opposite end of the quill, the fluid flows through a passageway 65 in the quide key 55 and is returned to the headstock by use of a sump pump.

The front spindle bearing 31 is further cooled through a coolant ring 59 surrounding the bearing 31 which receives fluid through the passageway 47. Lubricant circulates about the ring in annular grooves 69 provided in the periphery of the ring, exits under pressure into the headstock housing through the slot 48 and radial port 66, and returns to the headstock sump through the exit pipe 44.

In order to rotatably drive the sleeve 26 and spindle 20, a motor 70 is provided in a cavity 71 of the headstock housing directly above the spindle and quill assembly. The motor 70 is operatively connected to a planetary speed change transmission 72 by spur gears 74, 75. The output shaft 76 of the transmission 72 carries a spur gear 78 which drives a gear 79 rotatably supported by the headstock housing 22. An internally splined shaft 81 supported coaxially with the spindle 20 carries a gear 80 which engages the spur gear 79. The end of the spindle sleeve 26 is externally splined so as to provide a slip rotary drive connection between the sleeve 26 and the shaft 81. Thus, the motor 70 is adapted to impart rotary motion to the shaft 81, spindle sleeve 26, and spindle 20, while the sleeve 26 and quill 25 are adapted for axial movement relative to the shaft 81 and housing 22 and the spindle 20 is axially movable with respect to the quill and sleeve.

To effect axial movement of the quill 25 relative to the housing 22, a ball screw 85 is non-rotatably fixed to the depending guide key 55 and engages a ball nut 86 rotatably supported in the housing 22 by bearings 87 as shown in FIGS. 2a and 2b. By driving the ball nut 86, the screw 85 is bodily shifted which in turn pulls or pushes the quill 25 therewith. Preferably, the ball nut 86 includes a pair of nuts preloaded against each other on the screw to eliminate backlash.

In the illustrated embodiment, the ball nut 86 and the quill feed screw 85 are driven by a quill feed motor 89 through a drive train as shown in FIGS. 5 and 6. A spur gear 88 formed integrally on the ball nut 86 engages a gear 91 mounted at one end of a quill feed shaft 92. To traverse the quill 25, a clutch 94 disposed at the opposite end of the quill feed shaft 92 is adapted to selectively connect the shaft 92 to the quill feed motor 89 through gears 95, 96, a shaft 97, gears 98, 99 and a motor shaft 100.

To facilitate axially driving the spindle 20, the back end of the spindle is rotatably mounted in a ram 110 by bearings 111. The ram 110 is slidably supported by a ram guide 112 which is an extension of the head-stock housing 22. A ball nut 114 carried by a ball feed screw 115 is secured to the ram 110 by a mounting flange 116. The ball feed screw 115 is rotatably held between bearings 118 disposed in the housing 22. Rotation of the feed screw 115 by a feed motor 119 mounted at the end of the screw 115 causes the spindle 20 to be axially traversed.

The spindle 20 can be fed jointly with, or independently of, the quill 26 by using the motor 119. To this end, a clutch 120 is positioned at the end of the spindle feed screw 115 and is adapted to releasably connect the spindle feed screw 115 to the quill feed screw nut 86 through gears 121 and 122, 88 and 91. The gear ratios of the drives are such that the spindle and quill feed at the same rate. The quill can be traversed and fed independently of the spindle by motor 89 with clutch 120 released and clutch 94 engaged.

The quill feed motor 89 serves the additional purpose of operating the drawbolt 34. The drive from the motor 89 to the drawbolt 34 includes the motor shaft 100, gears 131, 132, shaft 134, gears 135, 136, and a selectively operable positive jaw tooth clutch 147. When the clutch is engaged the drawbolt is rotatably driven from the motor 89.

In further carrying out the invention, a hydraulic clamping means is provided for rigidly securing the quill in an axially extended position without disturbing the quill alignment. To this end as shown in FIG. 2a, a hydraulic clamp 140 utilizes the outside diameter of the quill feed screw 85 as a clamping surface. The clamp 140 includes an outer sleeve 141 secured to the headstock housing by screws 142 through which the quill feed screw axially passes. Immediately surrounding the feed screw 85 is a pair of relatively thin walled axially aligned sleeves 144 which are sealed to the outer sleeve 141 by means of two pairs of O-rings 145. Hydraulic pressure may be applied to the thin sleeves 144 through a pair of radial ports in the outer sleeve, not visible in FIG. 2a, which respectively connect the sleeves 144 to an appropriate fluid pressure source. When pressure is applied to the sleeves 144, they contract and rigidly clamp the outer surface of the feed screw which thereby holds the quill in a fixed axial position relative to the headstock. When the quill is to be axially moved, the pressure may be reduced and the feed screw advanced through the clamp sleeves.

It should be appreciated that since the clamp 140 grips the quill feed screw rather than the quill directly it does not affect the precise alignment of the quill. Heretofore, clamps which acted directly on the relatively thin walled quill often distorted the quill in the area where pressure was applied, causing misalignment of the quill and the cutting tool which is secured to either the spindle or spindle sleeve.

As can be seen from the foregoing detailed description, the present invention provides servo control to the tool spindle which is carried in a quill adapted to be fed extensively with the spindle. The quill provides greater machining capacity by extending the reach of the spindle into confined areas heretofore inaccessible. The hydrostatic bearings for the quill and quill guide key provide rigid radial support to the quill so as to permit additional extensibility while maintaining accurate axial alignment. Exact alignment of the quill and spindle is further maintained by a hydrostatic clamp which rigidly secures the quill feed screw when it is not being axially adjusted.

I claim as my invention:

1. A machine tool spindle headstock comprising, in combination, a headstock housing having a bore within which a quill is supported for axial translation, said quill having a continuous uninterrupted outer bearing surface, a spindle sleeve rotatably supported within said quill, by antifriction bearing means, said quill being formed from concentric overlapping tubes having internal longitudinal passageways therebetween for the supply and return of lubricating and cooling fluid to said anti-friction bearing means, a spindle supported within said sleeve for axial traverse relative to said sleeve, means for rotatably driving said spindle and sleeve, hydrostatic bearing means cooperating with said outer quill bearing surface to support said quill in said bore so as to permit substantially friction free axial movement of said quill while providing rigid radial support capable of maintaining accurate axial alignment of said quill and said spindle when in an extended position, and driving means for axially traversing said quill and said spindle independently and simultaneously.

2. A machine tool spindle headstock comprising, in combination, a housing, a quill supported in said housing for axial translation relative thereto, said quill having a continuous uninterrupted outer bearing surface, means for axially transversing said quill, a spindle rotatably supported within said quill by anti-friction bearing means, said quill being formed from concentric overlapping tubes having internal longitudinal passageways therebetween for the supply and return of lubricating and cooling fluid to said anti-friction bearing means, hydrostatic bearing means in said housing including a pair of longitudinally spaced pressure pads which define circumferentially spaced fluid chambers about the periphery of said outer quill bearing surface, a fluid supply port associated with each fluid chamber, and means for supplying pressurized fluid to said chambers through said ports so that a pressurized film of liquid is maintained between said pads and quill bearing surface which retains the quill in a predetermined radial position relative to said housing throughout axial movement of the quill, said quill having an axial length substantially greater than the longitudinal spacing between said bearing pressure pads, and said quill being axially extendable to overhang said hydrostatic bearing supports up to one-half the full length of the quill.

3. A machine tool spindle headstock comprising, in combination, a headstock housing having a bore within which a quill is supported for axial translation, said quill having a continuous uninterrupted outer bearing surface, a spindle sleeve rotatably supported within said quill, a spindle disposed within said sleeve for axial traverse relative to said sleeve, means for rotatably driving said spindle and sleeve, hydrostatic bearing means supporting said quill which permits substantially friction free axial movement of said quill while providing rigid radial support capable of maintaining accurate axial alignment of said quill and spindle when in an extended position, said headstock housing being formed with guide surfaces parallel to the longitudinal axis of the quill, a depending guide key secured to the end of said quill cooperating with said headstock guide surfaces to accurately guide the axial movement of said quill relative to said headstock housing, said guide key having a hydrostatic bearing relationship with said headstock, and driving means for axially traversing said quill and spindle independently and simultaneously.

4. The machine tool spindle headstock of claim 3 in which said headstock guide surfaces comprise a pair of opposed parallel surfaces, said depending guide key being formed with bearing pads on its opposite sides which have close fitting relation with said guide surfaces and define fluid chambers therewith, and means for supplying pressurized fluid to said chambers so that a pressurized film of liquid is maintained between said bearing pads and guide surfaces which enable substantially friction free movement of said guide key while providing accurate support.

5. The machine tool spindle headstock of claim 3 in which said driving means for traversing said quill includes a ball nut and screw assembly secured to said depending quill guide key, a quill feed motor adapted to drive said ball nut and screw assembly so as to impart axial movement to said guide key and quill relative to said housing and spindle, and said driving means for traversing said spindle includes a second ball nut and screw assembly secured to said spindle, and a spindle feed motor adapted to drive said second ball nut and screw assembly so as to impart axial movement to said spindle relative to said quill and housing.

6. The machine tool spindle headstock of claim 5 in which a clutch is selectively engageable with said quill feed ball nut and screw assembly with said spindle feed motor drives the spindle and quill simultaneously and at the same rate.

7. The subject matter in claim 3 in which said driving means for axially traversing said quill and spindle includes a quill feed ball screw rigidly fixed to said guide key projecting rearwardly of the quill in parallel alignment therewith, a ball nut rotatably supported in said housing engaging said ball screw, a quill feed motor and a drive train connecting said quill feed motor to said ball nut so as to impart rotary motion to said nut and axial movement to said feed shaft and quill, said means for driving said spindle includes a ball nut secured to said spindle and carried by a spindle feed ball screw, and a spindle feed motor adapted to drive said spindle feed screw so as to impart axial movement to said ball nut and spindle.

8. The subject matter of claim 7 in which a hydraulic clamp is engageable with said quill feed screw so as to prevent axial movement of said screw during machining operations, said clamp having a pressure responsive sleeve surrounding said quill feed screw contracting and rigidly engaging said screw in response to the supply of pressurized fluid to said sleeve and expanding to permit axial movement of said screw when pressure is reduced.

9. A machine tool spindle headstock comprising, in combination, a headstock housing having a bore within which a quill is supported for axial translation, a spindle sleeve rotatably supported within said quill on a pair of anti-friction bearings, said quill being formed with passageways for the supply and return of lubricating and cooling fluid to said anti-friction bearings, a spindle disposed within said sleeve for axial traverse relative to said sleeve, means for rotatably driving said spindle and sleeve, a pair of longitudinally spaced hydrostatic bearings supporting said quill so as to permit substantially friction free axial movement of said quill while providing rigid radial support, said quill having an axial length substantially greater than the longitudinal spacing between said hydrostatic bearings, said headstock housing being formed with guide surfaces parallel to the longitudinal axis of said quill, a depending guide key secured to the end of said quill cooperating with said headstock guide surfaces to accurately guide the axial movement of said quill relative to said headstock housing, said guide key having a hydrostatic bearing relationship with said headstock, driving means adapted to axially traverse said quill to a position overhanging said hydrostatic bearings by more than half the full length of the quill, and driving means for axially traversing said spindle relative to said quill.

References Cited

UNITED STATES PATENTS

| | | | |
|---|---|---|---|
| 2,284,758 | 6/1942 | Morton et al. | 77—3 |
| 3,103,852 | 9/1963 | Bonnafe | 90—97 |
| 3,200,671 | 8/1965 | Porath | 77—5 |
| 3,211,025 | 10/1965 | Mottu | 77—3 |
| 3,221,606 | 12/1965 | Baldwin | 90—11.1 |

ANDREW R. JUHASZ, Primary Examiner

G. WEIDENFELD, Assistant Examiner

U.S. Cl. X.R.

77—3; 90—11; 308—5, 9